United States Patent [19]

Dutt et al.

[11] Patent Number: 5,234,551
[45] Date of Patent: Aug. 10, 1993

[54] EXTENDED NIP PRESS BELT HAVING AN INTERWOVEN BASE FABRIC AND AN IMPERVIOUS IMPREGNANT

[75] Inventors: William H. Dutt, Rensselaer; Thomas H. Curry, Clifton Park, both of N.Y.

[73] Assignee: Albany International Corp., Menands, N.Y.

[21] Appl. No.: 800,689

[22] Filed: Dec. 2, 1991

Related U.S. Application Data

[63] Continuation of Ser. No. 441,228, Nov. 22, 1989, which is a continuation of Ser. No. 14,624, Feb. 13, 1987, and a continuation-in-part of Ser. No. 735,707, May 17, 1985, abandoned, which is a continuation of Ser. No. 305,148, Sep. 24, 1981.

[51] Int. Cl.$^5$ .............................................. D21F 3/02
[52] U.S. Cl. .................................. 162/358.4; 162/901; 198/846; 198/847; 428/225; 428/245; 428/287
[58] Field of Search ................... 474/268; 139/383 A; 162/348, 358, DIG. 1; 198/846, 847

[56] References Cited

U.S. PATENT DOCUMENTS

| | | |
|---|---|---|
| 1,536,533 | 5/1925 | Sheehan . |
| 2,659,958 | 11/1953 | Johnson . |
| 2,718,791 | 9/1955 | Hose . |
| 3,278,667 | 10/1966 | Knox . |
| 3,613,258 | 10/1971 | Jamieson . |
| 3,808,092 | 4/1974 | Busker . |
| 3,974,026 | 8/1976 | Emson . |
| 3,994,765 | 11/1976 | Brinkmann . |
| 4,109,543 | 8/1978 | Foti . |
| 4,224,372 | 9/1980 | Romanski .................. 428/257 |
| 4,229,253 | 10/1980 | Crunin ....................... 162/358 |
| 4,229,254 | 10/1980 | Gill . |
| 4,238,287 | 12/1980 | Gill . |
| 4,330,023 | 5/1982 | Cronin . |
| 4,552,620 | 11/1985 | Adams ...................... 162/358 |
| 4,643,916 | 2/1987 | Kiuchi ....................... 427/176 |

FOREIGN PATENT DOCUMENTS

| | | |
|---|---|---|
| 0013890 | 1/1980 | European Pat. Off. . |
| 0027716 | 4/1981 | European Pat. Off. . |
| 1506409 | 2/1970 | Fed. Rep. of Germany . |
| 1625850 | 2/1970 | Fed. Rep. of Germany . |
| 2108423 | 9/1972 | Fed. Rep. of Germany . |
| 2829225 | 1/1979 | Fed. Rep. of Germany . |
| 2989637 | 4/1981 | Fed. Rep. of Germany . |
| 1210269 | 3/1960 | France . |
| 2164931 | 12/1972 | France . |
| 2219836 | 2/1974 | France . |
| 2455119 | 4/1980 | France . |
| 57-56598 | 11/1982 | Japan . |
| 1061 | 12/1967 | New Zealand . |
| 1071 | 10/1968 | New Zealand . |
| 893637 | 4/1962 | United Kingdom . |
| 1088066 | 2/1967 | United Kingdom . |
| 2000520A | 6/1977 | United Kingdom . |
| 1599347 | 7/1977 | United Kingdom . |
| 2029471 | 9/1978 | United Kingdom . |
| 2048753 | 4/1979 | United Kingdom . |
| 2049754 | 4/1979 | United Kingdom . |
| 2050456 | 4/1979 | United Kingdom . |
| 2057027 | 8/1979 | United Kingdom . |
| 2062041 | 11/1979 | United Kingdom . |
| 2068431 | 1/1980 | United Kingdom . |
| 2106555 | 4/1983 | United Kingdom ............. 162/358.4 |
| 2106557 | 4/1983 | United Kingdom . |
| 2141245A | 6/1983 | United Kingdom . |
| 2186573 | 2/1986 | United Kingdom . |

OTHER PUBLICATIONS

Plastic Material Lecture (2), Polyurethane Resin, Tenth edition, pp. 152-158, issued from Nikkan Kogyo Shinbun-sha, on Feb. 10, 1978.
Kirk-Othmer Encyclopedia of Chemical Technology Second completely revised edition.
Modern Plastics* Encyclopedia Issue for 1961 Sep., 1960 vol. 38, No. 1A.

*Primary Examiner*—Steve Alvo
*Attorney, Agent, or Firm*—Kane, Dalsimer, Sullivan, Kurucz, Levy, Eisele and Richard

[57] ABSTRACT

An endless impervious, oil, abrasion, and crush resistant belt for use with papermaking machinery such as presses, especially of the extended nip type for the mechanical removal of water from a web of paper including a urethane coating impregnating a portion of a woven base providing multiple layers of base void of urethane and the portion impregnated impervious to oil, water, and air. The impregnated surface of the belt is made smooth and uniform in thickness through a grinding and polishing operation to act as a hydraulic bearing surface. The portion of the base void of urethane is capable of receiving and carrying water essential in the papermaking process.

9 Claims, 2 Drawing Sheets

EXTENDED NIP PRESS BELT HAVING AN INTERWOVEN BASE FABRIC AND AN IMPERVIOUS IMPREGNANT

RELATED APPLICATIONS

This is a continuation of copending application(s) Ser. No. 441,228 filed on Nov. 22, 1989 which is a continuation of Ser. No. 014,624, filed Feb. 13, 1987, and a continuation-in part of application Ser. No. 735,707 filed May 17, 1985 which was a continuation of application Ser. No. 305,148 filed Sep. 24, 1981, now abandonded.

BACKGROUND OF THE INVENTION

The field of the invention relates to a belt used for extracting water from a web of material, and more particularly from a fibrous web formed in a papermaking machine.

During the papermaking process, a web is formed by depositing a fibrous slurry on a forming wire. A large amount of water is drained from the slurry during this process, after which the newly-formed web proceeds to a press section. The press section includes a series of press nips. The web finally proceeds to a drying section including heated dryer drums where the water content is reduced to a desirable level.

In view of the high cost of energy, it is desirable to remove as much water as possible from the web prior to its entering the drying section. The dryer drums in this section are often heated by steam and costs can be substantial if a large amount of water needs to be removed.

The use of the extended nip press has been found to be advantageous over the use of nips formed by pairs of adjacent rollers. By extending the time the web is subjected to pressure in the nip, a greater amount of water can be removed. This fact has been recognized by those skilled in the art, and several patents have been granted in the area. These patents include Re. U.S. Pat. Nos. 30,268, 4,201,624, 4,229,253 and 4,229,254.

Fibrous webs dewatered by a conventional belt in the extended nip press have been heavy weight flow controlled, sheets such as linerboard which has a basis weight of between 110 to 410 grams/sq. meter. The ability to dewater in "flow controlled" sheets is time dependent. The longer the dwell time in the press nip, the more water can be removed. The prior art sandwich felt system of dewatering linerboard in the extended nip press requires that the top roll be vented. Venting is generally accomplished by machining annular grooves in the top roll 0.100" deep by 0.02" wide at 8 grooves to the inch of width. Water from the fibrous web is squeezed and passes into and through the sandwiched felts and channels into these grooves. Without the grooves, less water could be removed in the extended nip.

Another consideration is that with the dewatering of lightweight webs of paper such as newsprint or fine paper which range from 40 to 95 grams/sq. meter, the function is more pressure controlled than flow controlled. Because lightweight paper dewatering is substantially pressure controlled, a grooved top roll would mark the sheet via the high loading in the extended nip press. The configuration of the extended nip press for use with fine paper or newsprint sheets would require the use of a smooth hard surface top roll and the elimination of the top sandwich felt which would provide the uniform pressure and impart a smooth surface to the web to be dewatered.

The problem with this configuration is that there is no means for the expelled water to be evacuated from the extended nip with the grooves have been eliminated from the top roll.

Attempts to make belts that have grooves on the felt side have been made. Unfortunately, the grooves mark the sheet and only provide a minimum of 0.016 cubic inches of void per square inch of surface area.

In using the extended press to dewater a fibrous web, the web has typically been sandwiched between two moisture-absorbing felts and a belt. The felts are trained around a cylindrical press roll with the web between them while the belt is arranged for applying pressure to the felts and roll. A pressure shoe exerts pressure on the belt in the press area and the shoe and belt are lubricated with hydraulic oil.

SUMMARY OF THE INVENTION

The invention is directed to a belt for dewatering a fibrous web used in an extended nip press provided by the roll and belt under the influence of the pressure shoe for applying pressure to the felt and fibrous web and belt in the nip. The belt comprises a base fabric which is partially impregnated with a thermoplastic or thermosetting polymeric material. The base fabric has a coated and impregnated side which would operate against the pressure shoe and a second side facing the felt and web. This second side contains voids into which water or other liquid could be transferred during passage of the felt and web through the nip. A significant advantage of this belt construction is that it can be made in any length since it does not require a mandrel during the manufacture thereof. A base fabric may be made endless using conventional fabric technology and then coated with the material.

The present invention provides a means for the water to be evacuated from the nip when a solid top roll and single felt system is employed. The vented belt with its coated side running against the pressure shoe enables expelled web water to evacuate via the internal void volume on the uncoated side of the belt.

The vented belt of this invention has a typical void volume of over 3 times that of a grooved belt. The belt of the present invention has a typical void volume of over 0.058 cubic inches/square inch of surface. This provides two functions. One—to be able to carry more water than a grooved belt, and second—to reduce hydraulic pressure which retards water flow.

In addition to these advantages, the mere surface structure of the present invention provides a smoother surface to the wet felt and fibrous web thus reducing the possibility of mark to the fibrous web.

The resulting structure is both light in weight and sufficiently stable to operate under paper machine conditions. It has sufficient abrasion resistance to resist any wear that might take place in the extended nip apparatus. Unlike materials which are built up in the manner of a rubber tire and can flow and/or delaminate, the invention provides a belt which will maintain its integrity. It also solves the problem of venting the nip press.

DETAILED DESCRIPTION OF THE INVENTION

Figure 1:
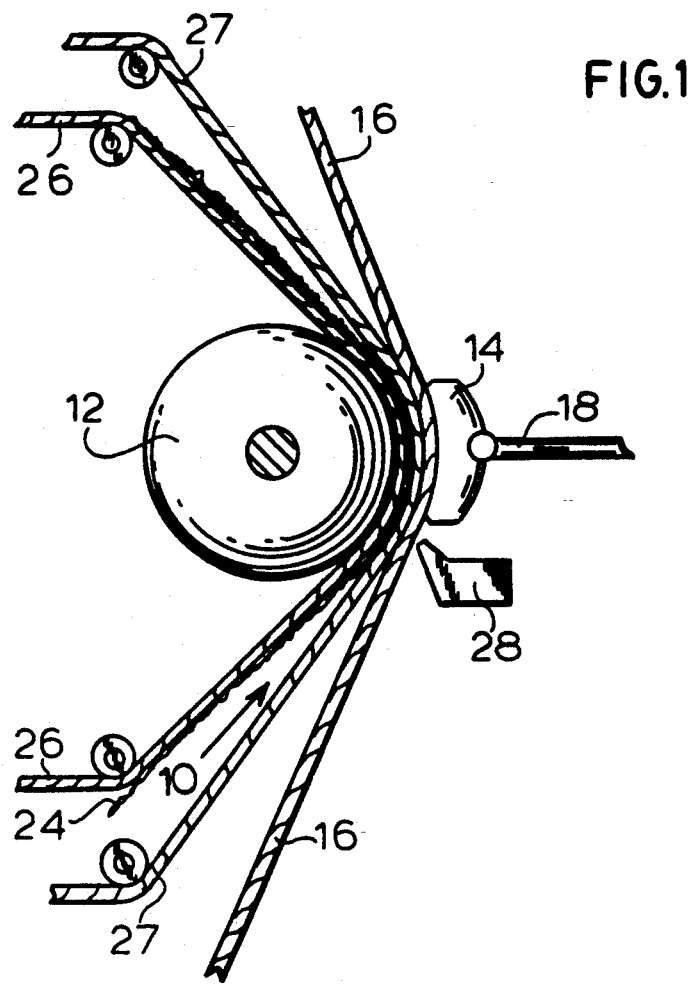
FIG. 1 is a side elevational view of an extended nip press utilizing the belt of the present invention.

An extended nip press for dewatering a travelling web of material is shown in FIG. 1. The nip 10 is defined by a cylindrical press roll 12, a pressure shoe 14 having an arcuate surface facing the press roll, and the belt 16 of the invention arranged such that it bears against the surface of the press roll. The arcuate surface of the pressure shoe has about the same radius of curvature as the press roll. The distance between the press roll and the pressure shoe may be adjusted by means of conventional hydraulic or mechanical apparatus (not shown) connected to a rod 18 pivotally secured to the shoe 14. The rod may also be actuated to apply the desired pressure to the shoe. It will be appreciated that the pressure shoe and press roll described above and shown in FIG. 1 are conventional and that other arrangements may be utilized in accordance with the invention.

Figure 2:
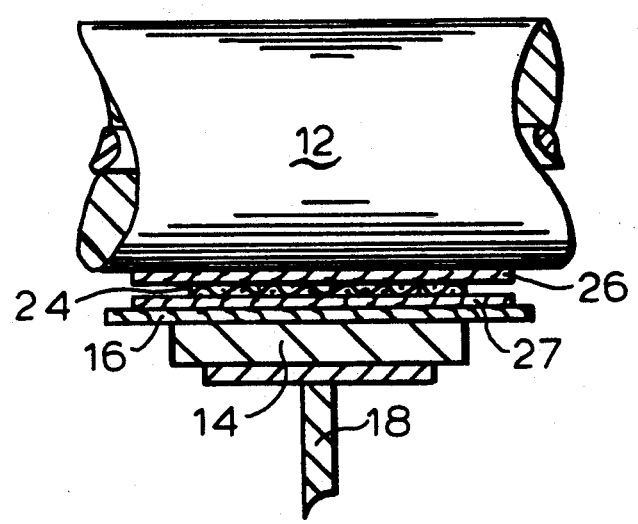
FIG. 2 is a sectional side elevational view of a two-layer belt constructed in accordance with the invention.

An embodiment of a two-layer belt 16 constructed in accordance with the invention is shown in detail in FIG. 2. The belt 16 comprises a two-layer woven monofilament base fabric 20 with multifilament or spun stuffer yarns 21. The belt is partially impregnated with a polymeric material 22 with the stuffer yarns acting as barriers to the impregnation of the belt on the remaining side, which is the lower side as shown in FIG. 2. Thermosetting resins such as polyurethanes have been found to be suitable impregnating materials. Thermoplastic polymers such as polypropylene are also acceptable.

The base fabric 20 is sufficiently open to allow impregnation to eliminate the possibility of undesirable voids forming in the final fabric on the pressure shoe side. These voids are undesirable because they allow the lubrication used between the belt and shoe to pass through the belt and contaminate the felt and fibrous web. The stuffer yarns 21 provide a barrier of sufficiently low permeability to prevent passage of the resin during the coating and impregnating process to the side with voids. It is endless in final construction and uniform in thickness. The fabric must also be made to have sufficient stability under paper machine conditions. In other words, it must have length stability, width stability, and guidability.

The thermoplastic resin or thermosetting resin used should be substantially one hundred percent solid composition to avoid the formation of bubbles during the curing process of the resin in the belt structure which could cause voids on the coated side.

Side 17 of the belt can be ground smooth for contact with the pressure shoe 14. The opposite side contains voids, as a result of the weave and absence of impregnation, into which liquid can be transferred during the passage of the web, felt and belt through the nip. It has been found that the preferred range of void volume on the vented (nonimpregnated) side of the belt is from 0.005 cubic inches per square inch of surface area to 0.20 cubic inches per square inch of surface area.

Figure 3:
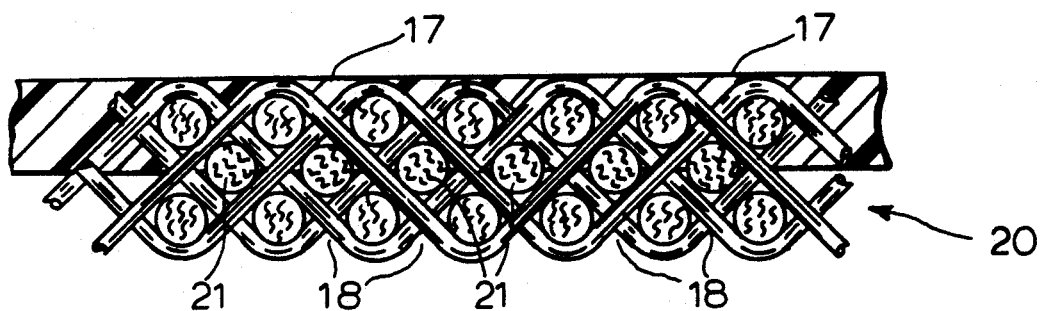
FIG. 3 is a sectional side elevation view of a three-layer belt constructed in accordance with the invention.

A three-layer embodiment of the invention is shown in FIG. 3. The components are similar to those in FIG. 2. The components of FIG. 3 are numbered as those of FIG. 2 with a prime following. Belt 16' of FIG. 3 is a multilayer structure with a barrier layer provided by stuffer yarns 21'. These stuffer yarns, 21', can be multifilament or spun. The belt is coated and impregnated as described previously to provide a smooth impervious surface 17' and a surface with voids 18' on the remaining side. The use of belt 16' is the same as previously described for belt 16.

Figure 4:
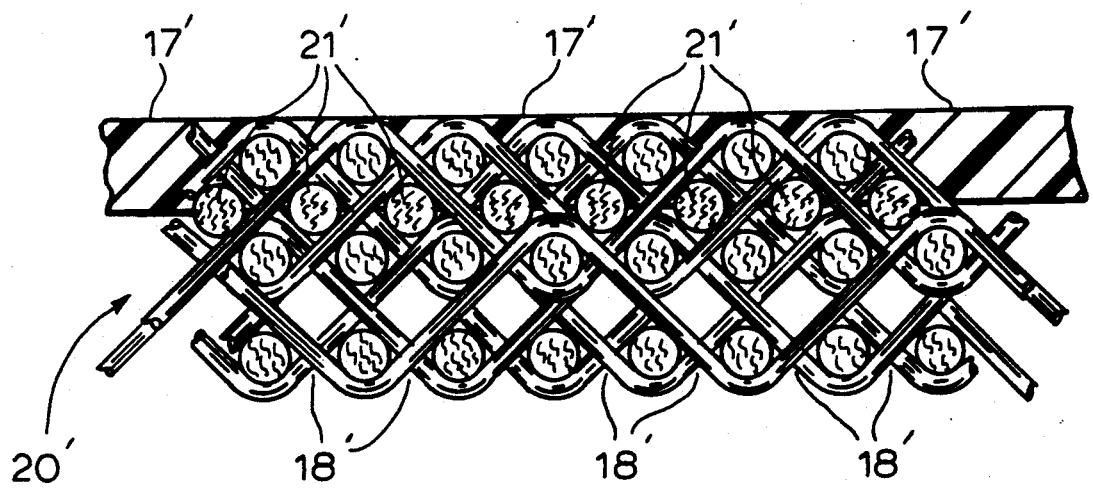
FIG. 4 is a sectional side elevational view of a four-layer belt constructed in accordance with the invention.

A four-layer embodiment of the invention is shown in FIG. 4. The components are similar to those in FIGS. 2 and 3 and are numbered the same with a double prime following. Belt 16" of FIG. 4 is a four-layer structure with a barrier layer provided by stuffer yarns 21" which can be multifilament or spun. The belt is coated and impregnated as previously described to provide a smooth impervious surface 17" and a surface voids 18". An example of the embodiment of FIG. 4 is the four-layer duplex weave having a spun yarn stuffer the cross machine direction and located between the first and second layers.

A single system of warp yarns 24 comprised of 0.016 inch diameter monofilament nylon arranged in a density of 80 to the inch.

A multiple system of weft yarns 26 comprised of four layers of 0.021 inch diameter monofilament nylon arranged in a density of 64 to the inch. Between the first and second layers, a spun stuffer 21" comprised of 100% polyester staple fiber 6 denier, $3\frac{1}{2}$" staple, single ply, at a weight of 1,000 grams per 100 yards, at a density of 16 to the inch.

The entire base structure weights 5.4 ounces per square foot and after impregnating on the spun stuffer side, 11.46 ounces per square foot.

Belts manufactured in accordance with the invention have been found to have many desirable characteristics. They move easily over the pressure shoe and are capable of transmitting pressure from the shoe to the web and press roll. Sufficient flexibility is obtained, and the belts have proven to be unaffected by lubricant applied prior to entering the press nip.

The manufacture of the belt according to the invention may be accomplished economically and without the need for mandrels or autoclaves which limit the size of other belts. A belt of any length can accordingly be produced. A web may be needled into the woven base if desired. If the base structure has not been woven endless it is joined endless using conventional joining techniques applicable to forming fabrics in the paper industry.

The belt is easily repaired should a hole or other surface irregularity develop therein. The damaged portion can be cleaned with a solvent and a suitable amount of coating applied to the affected area. A heat gun can then be employed to cure the surface which can then be sanded.

Because of the excellent flexibility characteristics of the base structure and the fact that the coating layers can be kept to a minimum, the surface of the belt will have less tendency to fail due to bending fatigue. This is due to the fact that, because of the low caliper, the surface plane of the coated surface is at a minimum distance from the neutral axis of bending.

It will be appreciated that the belt utilized in the invention may include a base fabric made from various polymeric materials having the necessary properties for application in papermaking machines. Materials other than polyurethane and polypropylene may also be employed as the coating material. Also the weave of the belt may be altered although a multilayered belt is desirable for creation of the voids. Known coating and impregnating techniques may be employed in the practice of this invention.

I claim:

1. An extended nip press belt for use in dewatering a fibrous web transported by a papermaker's felt means in an extended nip press of the type having a cylindrical press roll and a pressure shoe for applying pressure to the felt means and fibrous web wherein a lubricant is used between the belt and the pressure shoe, said belt having an inner surface and an outer surface and comprising:

an interwoven base fabric, said interwoven base fabric being in the form of an endless loop, said endless loop having an inner side and an outer side, said inner side of said base fabric having an impregnant formed thereon and penetrating thereinto, said impregnant being buffed to provide a smooth impervious machine ground surface on said inner side of said base fabric, said impregnant thereby being the inner surface of said extended nip press belt and slidingly engaging said pressure shoe, and being impervious to the lubricant used between the belt and the pressure shoe, said base fabric and said impregnant comprising said belt which is uniform in thickness, said outer side of said base fabric being the outer surface of said belt, said outer surface of said belt having voids, whereby, upon passage of said papermaker's felt means, in the nip of said press, between said press roll and said belt, said pressure shoe engaging said inner surface of said belt and applying pressure to said felt means and said fibrous web therethrough, liquid is transferred from the felt means engaged thereby through the medium of voids therein.

2. A belt for use in dewatering a fibrous web in an extended nip press in accordance with claim 1, wherein said impregnant is substantially 100% solid composition as impregnated into the belt.

3. A belt for use in dewatering a fibrous web in an extended nip press in accordance with claim 1, wherein said base fabric is a multilayer fabric with a non-face layer of stuffer barrier yarns.

4. A belt for use in dewatering a fibrous web in an extended nip press in accordance with claim 1 wherein said impregnant is substantially 100% solid polyurethane resin as impregnated into the belt.

5. A belt for use in dewatering a fibrous web in an extended nip press in accordance with claim 1 wherein said base fabric is woven.

6. A belt for use in dewatering a fibrous web in an extended nip press in accordance with claim 1 wherein said base fabric is monofilament with the exception of stuffer yarns which are multifilament or spun.

7. A belt for use in dewatering a fibrous web in an extended nip press in accordance with claim 2, wherein said base fabric is a multilayer fabric with a non-face layer of stuffer barrier yarns.

8. A belt for use in dewatering a fibrous web in an extended nip press in accordance with claim 2 wherein said base fabric is woven.

9. A belt for use in dewatering a fibrous web in an extended nip press in accordance with claim 2 wherein said base fabric is monofilament with the exception of the stuffer yarns which are multifilament or spun.

* * * * *